Jan. 28, 1947.                B. F. MIESSNER                2,414,886
                    APPARATUS FOR THE PRODUCTION OF MUSIC
                Original Filed Dec. 19, 1934    4 Sheets-Sheet 1

INVENTOR:—
BENJAMIN F. MIESSNER,
BY Charles L. Jacobs,
ATTORNEY.

Jan. 28, 1947.　　　　B. F. MIESSNER　　　　2,414,886
APPARATUS FOR THE PRODUCTION OF MUSIC
Original Filed Dec. 19, 1934　　4 Sheets-Sheet 2

INVENTOR:—
BENJAMIN F. MIESSNER,
BY
ATTORNEY.

Jan. 28, 1947.  B. F. MIESSNER  2,414,886
APPARATUS FOR THE PRODUCTION OF MUSIC
Original Filed Dec. 19, 1934   4 Sheets-Sheet 3

INVENTOR:—
BENJAMIN F. MIESSNER,
BY Charles T. Jacobs,
ATTORNEY.

Jan. 28, 1947.          B. F. MIESSNER                    2,414,886
             APPARATUS FOR THE PRODUCTION OF MUSIC
                Original Filed Dec. 19, 1934      4 Sheets-Sheet 4

INVENTOR:—
BENJAMIN F. MIESSNER,
BY Charles I. Jacobs,
ATTORNEY.

Patented Jan. 28, 1947

2,414,886

UNITED STATES PATENT OFFICE 2,414,886

APPARATUS FOR THE PRODUCTION OF MUSIC

Benjamin F. Miessner, Harding Township, Morris County, N. J., assignor to Miessner Inventions, Inc., a corporation of New Jersey Application December 19, 1934, Serial No. 758,155
Renewed October 15, 1935

20 Claims. (Cl. 84—1.14)

This invention relates to the production of music, and more particularly to such production by the use of tuned reeds.

It is an object of the invention to provide an improved musical instrument, for example an organ, whose output tone is derived from the vibrations of tuned reeds.

It is another object to provide improved means and methods for vibrating the reeds in such an instrument.

Another object is the provision of improved means and methods for deriving the output sound from the reed vibrations.

It is another object to provide improved and novel arrangements and combinations of apparatus adapted for the selective production of a variety of types of output tones.

Still another object is the provision of means and methods for controlling the timbre and other qualitative characteristics of the output sound.

Other and allied objects will more fully appear from the following description and the appended claims.

In such description reference is had to the accompanying drawings, in which.

While I intend no precise limitation by the use of the term "reed," I have employed and prefer as reeds relatively thin bars of metal or other material, fastened or clamped only at one end. Reeds of this nature are themselves well known in the organ art, as are the principles of their proper apportionment for purposes of tuning. Customarily vibrations of such a reed are made audible by direct coupling of the reed to the air, or by the valve action of the reed controlling a flow of air separately stimulated by pressure or suction, which stimulation may also act as the reed vibrating force. In my improved instrument I translate the reed vibration into electric oscillations and these in turn into sound, the reed thus being freed of any requirement for high coupling to the air or for high valve action efficiency. I may still use air stimulation as a reed vibrating force, and since the manner of reed excitation principally contemplated in this description is air stimulation, I find it convenient at this point to illustrate two known reed supporting arrangements for air excitation.

Figure 1:
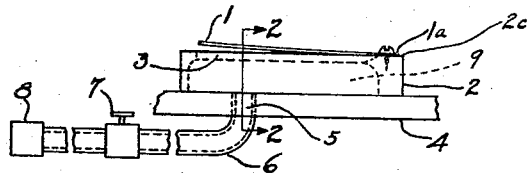
Figures 1 and 2 are respectively elevational and cross-sectional views of a reed, reed block and exciting system of a form which I may employ.
Figure 2:
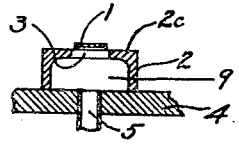

The first of these is shown in Figures 1 and 2. In these figures the reed appears as 1, being preferably slightly concave when viewed from its top and being fastened at an extremity 1a to the top 2c of the reed-block 2. This block is in the form of an inverted rectangular trough, the top 2c of the block (or base of the trough) being provided with an aperture 3 which terminates just short of the fastened reed extremity 1a and is large enough to permit the reed to vibrate in and out of the aperture with slight clearance. The block may be mounted to any convenient base 4 in which is provided an air-hole 5 communicating with the space 9 within the block. This hole is connected by a suitable air-duct 6 through the control valve 7 to the chest 8. While chest 8 may be either a source of air pressure or air suction, the latter is preferred and the reed is accordingly shown in a position of rest with its main portion slightly above the plane of the aperture 3.

The reed of course has a definite natural vibrational mode and period of its own, established by its material, length and thickness; were it excited in some theoretical, simple manner its free vibration would wholly conform to these natural characteristics. The air excitation, however, results in forced vibration of the reed, in which the actual vibrational characteristics are influenced by the environment of the reed. While the influence on vibrational period may be negligible in practical cases, the influence on vibrational mode is marked. I have found particularly significant, in effect on the vibrational mode, the thickness of the top 2c of the block. A possible explanation of the influence of environment on the vibrational mode, in which the effect of top thickness is accounted for, is as follows.

When suction is created in the space 9, as by opening of the valve 7, a downward force is thereby imparted to the reed. This is at first of only a moderate value, because of the air leakage permitted by the vertical space between the bottom of the reed and the upper surface of the block top 2c. In response to this force, however, the reed moves downwardly; the suction force is somewhat increased as the main portion of the reed passes through the aperture 3, since the leakage path is then restricted to that small space which intervenes between the reed periphery and the walls of the aperture. Presently the suction force reduces again as a larger leakage path is opened up between the top of the reed and the lower surface of the block top 2c and this, coupled with the now high upward restoring force of the reed, causes the reed to start an upward movement which will move the reed to a position above that of rest before the next reversal of direction. Thus the reed vibration is initiated and within a relatively few cycles it will be stabilized in some definite mode. In analyzing this mode it is convenient to consider a cycle beginning and ending with maximum upward reed displacements.

With this reed displacement the reed acceleration is of course at a maximum negative (downward) value. As the reed moves downwardly this acceleration reduces in negative value and swings positive as the reed passes its approximate position of rest. As the main reed portion enters the aperture a significant negative acceleration component is imparted to the reed by the now significant suction force; this component will significantly reduce the net positive value of the acceleration, though it may not be sufficient actually to reverse the sign of the acceleration. As the main reed portion passes below the aperture the suction negative acceleration component falls off, the inherent reed acceleration becomes highly positive, and the net acceleration reaches a positive peak; reversal of direction ensues. As the reed moves upwardly its inherent positive acceleration of course decreases; furthermore the suction negative acceleration comes again significantly into play. This time this component is of a much higher value than on the reed downstroke, since the reed itself is now moving in a direction to increase rather than to comply with the suction. Accordingly the net acceleration reduces sharply in positive value and actually swings negative as the reed passes through substantial alignment with the aperture. As the reed moves on upwardly the leakage path opens up, the suction negative acceleration drops off, and the net acceleration jumps back to some positive value. As the reed passes above its approximate position of rest its inherent acceleration, and the net acceleration, of course swing negative and steadily increase to the initial negative maximum as the reed approaches its initial maximum upward displacement.

Thus the net reed acceleration, instead of being simply sinusoidal and thus characterized by two axis intercepts per cycle, is of a complex waveform characterized by at least four axis intercepts per cycle. The velocity curve of the reed is accordingly invested with at least two positive and two negative peaks per cycle, and the displacement curve by at least one significant flattening intermediate positive and negative peaks. If the acceleration becomes momentarily negative as the reed passes through the aperture on the downstroke as well as on the upstroke, each of the acceleration, velocity, and displacement curves will be qualitatively as well as quantitatively still more complex.

These departures of the curves from sinusoidal nature are obviously produced by the passage of the reed through the aperture, and quantitatively they are determined by such factors as the reed parameters, the mean suction value, the size of the space 9 within the block, and the relative leakage paths at different instants in the cycle. The last of these factors is obviously significantly affected by the spacing from rest position to the block top 2' and by the thickness of the block top—i. e., height of the aperture walls.

Figure 3:
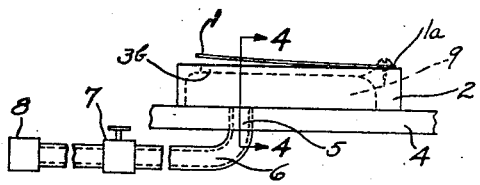
Figures 3 and 4 are similar views for a slightly modified form of block.
Figure 4:
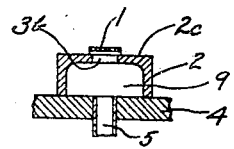

The type of reed whose mounting and manner of vibration have just been described may be termed a "free" reed, in that it impinges against nothing during its vibration. Another type of reed is illustrated in Figures 3 and 4; this type of reed is termed a "beating" reed. Referring to these figures, the reed itself is designated as 1, being permissibly quite similar to the reed of Figures 1 and 2. The block 2, base 4, base hole 5, duct 6, valve 7, chest 8 and space 9 all appear as in the other figures; but the aperture (designated as 3b) in the block top 2c is now made smaller than the reed area, so that the edges of the reed overhang the edges of the aperture. In this case when suction is applied to the space 9 sufficient downward force is applied to the reed to start it moving downwardly. As it moves downwardly the side marginal portions of its bottom surface come into contact with the block top 2c for progressively greater distances from the fastened reed end 1a, the reed being sufficiently flexible to straighten progressively from its normal slightly curved form. The leakage path is of course progressively reduced and the downward suction force (negative suction acceleration) progressively increased; meanwhile, however, the inherent upward acceleration of the reed is increasing, and presently the net acceleration reaches a maximum and the reed starts an upward movement which carries it above its rest position to an upward maximum displacement from which it begins another downward movement. Because the beating reed in its vibration keeps impinging against an adjacent object—i. e., the block top—its vibrational mode tends to contain more of the relatively high partials than that of the free reed.

Having thus described two general types of reeds, I proceed to a consideration of the translation into electric oscillations of their vibrations. This may be accomplished in any of a variety of ways. While throughout the later portion of this description I show and refer principally to electrostatic translation, I first show and describe certain alternative forms of translation.

Figure 5:
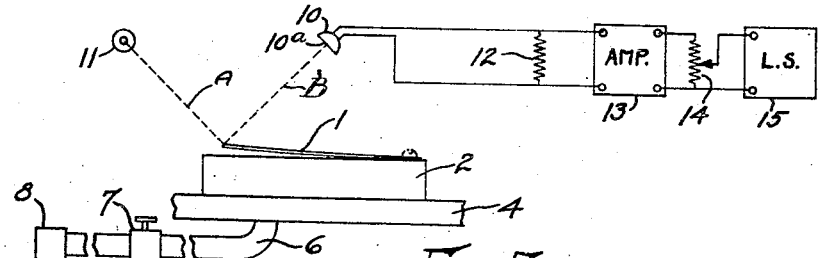
Figures 5, 6, 7 and 8 are respectively views, partly schematic, of a reed and various forms of mechanico-electric translating apparatus therefor.

In Figure 5, 1 is a reed of polished metal or other light reflecting material. This may be mounted to reed block 2 and arranged as either a free or a beating reed; as a typical exciting system, that shown in preceding figures has again been illustrated. Assuming the reed positioned approximately horizontally, I may mount above the reed, and displaced somewhat from a perpendicular to the reed at its free extremity, a photo-electric cell 10 with its light-admitting window 10a directed generally toward the reed; this cell may be assumed to be of the chemical or photolytic type, which generates a current proportional to the intensity of light reaching its window 10a. Electrically in series with the cell is provided the resistance 12. Also above the reed, but displaced from the abovementioned perpendicular in a generally opposite direction I may mount a light source 11 whose dimension in a line parallel with the shorter reed top dimension is preferably small. The precise position of this source is so adjusted, relative to reed and photo cell, that with the reed at rest approximately half the cell window 10a will be illuminated by light reflected from the reed. This condition is illustrated by the dotted line A in Figure 5, which represents the left-hand boundary of that light from source 11 which will be reflected by the reed, and by the dotted line B which represents the reflection of this boundary line. Each line is of course responsive to the angle of the reed; therefore if the reed be vibrated and its angle thus shifted oscillatorily with relation to its mean, the line B and its points of intersection with the cell window will shift oscillatorily, alternately increasing and decreasing the light reflected onto the window. As will be understood, this causes an oscillatory variation of current through the cell and hence of voltage across the resistance 12. This voltage may be amplified by the amplifier 13, controlled in respect of volume by potentiometer 14, and translated into sound by the loudspeaker or other electro-acoustic translating device 15.

It will be obvious that if serious waveform distortion is to be avoided the amplitude of reed vibration must be limited to one which causes the line B to oscillate between and not beyond the extremities of the cell window.

Figure 6:
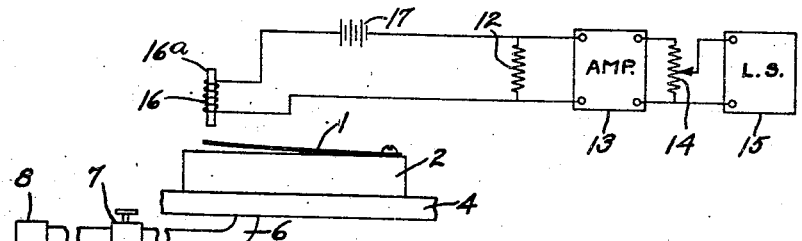

In Figure 6 I show an electromagnetic translating system. The reed again is designated as 1, and is shown mounted in block 2 as either a free or beating reed; in this case the reed need not be light-reflecting but is necessarily of magnetic material. The reed may again be vibrated in any manner, being again shown as arranged for pneumatic excitation. The reed is positioned to vibrate in the field of an electromagnet 16. For polarizing the electromagnet there is connected in series therewith the battery or other current source 17; this may, however, be omitted if the core 16a of the electromagnet be magnetized. Also in series with the electromagnet may be connected the load resistance 12, across which is connected the cascade of amplifier 13, potentiometer 14 and loudspeaker 15.

Figure 7:
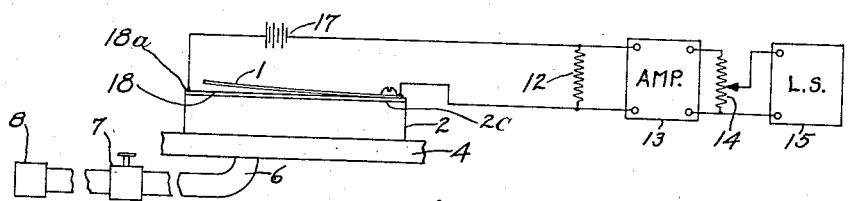

In Figure 7 I show a variable resistance translating system adapted for use with a beating reed 1. This reed is of electrically conductive material, and may be mounted to the block 2, which is of insulating material, in the manner shown in Figures 3 and 4. There is provided over the top 2c of the block, so that during reed vibration the edge portions of the bottom of the reed will come alternately more and less into contact therewith, a layer 18 of electrically resistive material such as carbon or graphite. An electrical contact 18a is made to the layer 18 at its extremity away from the fastened reed extremity, and between this contact and the reed are serially connected the battery 17 and the load resistance 12. As the reed vibrates the resistance between the reed and the contact 18a is oscillatorily varied, as are consequently the current through and the voltage across the resistance 12. The oscillatory voltage across this resistance may be amplified, controlled in respect of volume, and translated into sound by the cascade 13—14—15 as in earlier figures.

Figure 8:
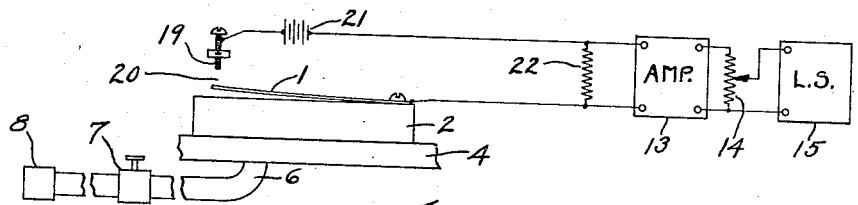

In Figure 8 I show the preferred electrostatic translation system. The reed, electrically conductive, is again designated as 1, mounted in block 2 as either a free or a beating reed; pneumatic excitation has again been illustrated. In slight spaced relationship to the reed is provided the electrically conductive member or electrode 19; this forms a small electrostatic capacity 20 with the reed. In series with this capacity is provided a battery or other voltage source 21 and a high resistance 22; these elements maintain in the capacity a charge relatively incapable of rapid variation. Upon vibration of the reed the capacity 20 will be oscillatorily varied; and by virtue of the relative constancy of the charge therein the voltage thereacross and the voltage across the resistance will vary oscillatorily. The oscillatory component the voltage across the resistance will be amplified, controlled in respect of volume, and translated into sound, by the amplifier 13, potentiometer 14 and loudspeaker 15, the amplifier being connected across high resistance 22.

Figure 9:
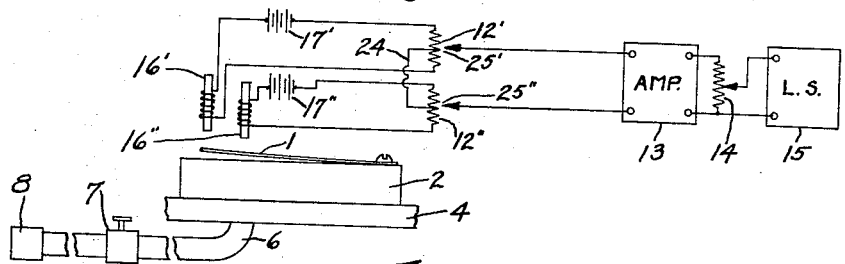
Figures 9, 10 and 11 are respectively views of similar nature to earlier figures, but illustrating various means of tone quality control.

In the case of the electromagnetic translation the electromagnet, and in the case of the electrostatic translation the electrode 22, may be termed a mechanico-electric translating device. With either of these forms of translation advantage may be taken of such differences in vibration waveform as may exist between materially separated portions of the reed to produce variation of output tone quality. This is done by providing, instead of a single translating device, a plurality of such devices in association with respectively different reed portions. This has been illustrated in Figure 9 for the electromagnetic translation by showing the two electromagnets 16' and 16'' in slight spaced relationship to two different portions of the reed. Each electromagnetic may be connected in series with a polarizing battery and a load resistance, the batteries respectively appearing as 17' and 17'' and the load resistances as 12' and 12''. By virtue of waveform dissimilarity between the vibrations of the different reed portions the oscillatory voltage outputs of the two mechanico-electric translating devices—i. e., the voltage across resistances 12' and 12''—will be of different waveform. By suitable circuit arrangements such as the connection 24 between the electrical centers of the resistances, and sliding contacts 25' and 25'' provided on the respective resistances and forming output terminals, these two oscillatory voltages may be combined in various phase and amplitude relationships to form composite currents of a variety of waveforms. These when amplified and translated into sound by the system 13—14—15 of course provide output tones of a corresponding variety of qualities.

Figure 10:
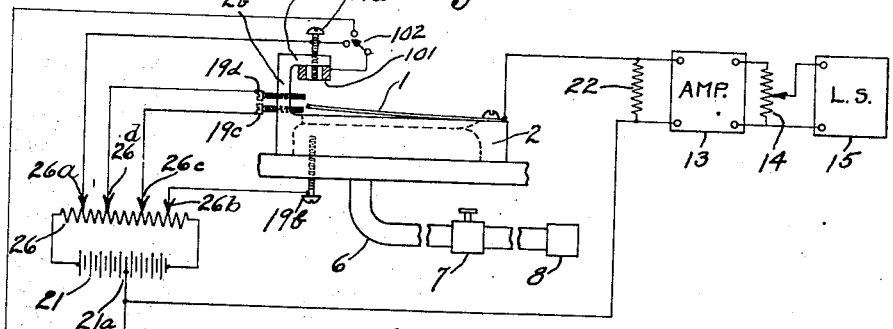

Because of limitations in the dissimilarity of waveform between different reed portions I prefer to employ a plurality of translating devices in association with substantially a single portion of the reed, with selective control over the outputs of one or more of the plurality. Such a system with a suitable arrangement of translating devices may be made to yield oscillatory voltages of a wide variety of waveforms. The selective control may of course be of the form just illustrated and described, or in the case of electrostatic translation, may be of a form in which the D. C. voltages applied in the circuits of the several translating devices are selectively controlled as to amplitude and polarity. In Figure 10 I illustrate the latter form of selective control with a system of plural electrostatic translating devices in association with substantially a single reed portion.

In this figure the reed and its block appear as in earlier figures, excepting that the reed block is conveniently provided with an additional portion described below. The portion of the reed from which translation will be effected is preferably the free end portion, since here the amplitude of vibration is greatest. To retain suitable electrodes in spaced relation to and insulated from this portion of the reed, the reed block 2 may be conveniently formed of insulating material such as Bakelite, and may be provided with a portion 2a folded-back from an upward vertical extension 2b of the end wall of the block nearer the free reed extremity. Through the portion 2a and the base 4 (in this figure necessarily of insulating material) are respectively threaded the electrodes or screws 19a and 19b, each of these being directed toward the reed end portion substantially in the line of its vibration; the reed will therefore vibrate toward and away from each. Through the vertical end extension 2b may be threaded further electrodes or screws such as 19c and 19d, these being directed generally toward the reed end portion, but in lines substantially at right angles to the line of its vibration and at levels within the range of vibration of the reed. The end portion of the reed in each cycle of its vibration will twice pass each of the electrodes or screws 19c and 19d, these being adjusted so that the reed end clears them by a very small margin. Obviously the reed has a capacity to each of the electrodes 19a, 19b, 19c and 19d, the reed vibration once a cycle increasing the capacities to electrodes 19a and 19b and twice a cycle increasing the capacities to the electrodes 19c and 19d.

The reed may be connected to one side of the high resistance 22, to the other side of which is connected the center point 21a of voltage source 21. Across this voltage source may be connected a potentiometer 26 having four sliding contacts 26a, 26b, 26c and 26d, each capable of movement over substantially the entire potentiometer independent of the positions of the others; these contacts may be respectively connected to the electrodes 19a, 19b, 19c and 19d. Across the high resistance 22 may be connected the amplifier control-speaker cascade 13—14—15 of previous figures.

In a most general sense the system is similar to, and functions as does, the simple system shown in Figure 8—i. e., it produces an oscillatory voltage across the resistance 22. There are now, however, a plurality of translating devices contributing to this voltage, and the joint action of the plurality may be best understood by considering each of the devices—i. e., each of the four electrodes—as a means of investing the waveform of the voltage in the resistance 22 with a peak or tendency toward a peak. The direction of the peak (whether up or down) produced by any electrode is determined by the polarity of the D. C. voltage applied to that electrode, the amplitude of the peak by the amplitude of such D. C. voltage, and the point or points of occurrence of the peaks in each cycle by the vertical arrangement of the electrode relative to the reed. Thus if the initial instant of the cycle be taken as that at which the reed is closest to the electrode 19a—i. e., at the upward extremity of its excursion—the electrode 19a is a means of investing the oscillatory voltage with a peak at the beginning of each cycle. The electrode 19b is responsible for a peak placed at 180° after the beginning of each cycle. The electrode 19c, if placed substantially opposite the mean or rest position of the reed, will give rise to peaks placed at 90° and 270° after the beginning of each cycle. The electrode 19d, if placed upward from the screw 12c by about half the distance of excursion of the reed end from mean position, will control peaks placed by 60° and 300° after the beginning of each cycle. Obviously by the use of an electrode suitably positioned a peak may be placed at any desired point in each cycle.

While the amplitude of each peak may be regulated by rotary adjustment of the electrode, so as to vary the spacing of its extremity from the reed, it is preferable that this spacing be fixed at a small enough value to insure significant capacity change with reed vibration. The amplitude of the peak will then be adjusted at will by adjustment of the position of the corresponding slider on potentiometer 26, this controlling the mean D. C. voltage on the corresponding electrode. Not only may the amplitudes of the peak be controlled by this means, but also the phase or direction of the peak, this direction being reversed as the appropriate slider is moved across the electrical center of the potentiometer 26.

It will be obvious that with several peaks in each cycle each under control as to amplitude and direction independently of all, (or of all but one) of the others, a very significant control over harmonic structure of the oscillations and quality of the output tone is provided. With a sufficient number of the electrodes 19a, 19b, etc., a single reed may be made to produce almost any desired quality of tone.

In Figure 10 I have shown a further detail in connection with the electrode 19a. Surrounding this electrode is a small cylindrical shield 101, shown in cross section. This shield may by switch 102 be connected the electrode 19a or to the battery midpoint 21a. When the shield is connected to the electrode, its only effect is slightly to increase the capacity of the reed to that electrode. When it is connected to the battery mid-point, however its effect is to suppress the amplitude of the peak produced by 19a until practically the central instant of the peak, when the reed is closest to 19a. By such shields the peaks produced by any of the electrodes may be similarly narrowed.

Figure 11:
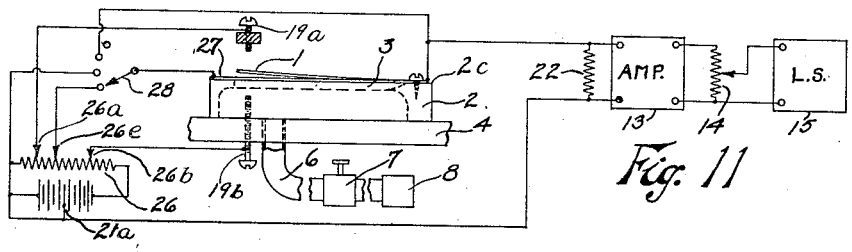
Figure 12:
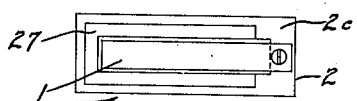
Figure 12 is a top view of the reed and block assembly of Figure 11.

The foregoing description of Figure 10 has of course assumed that each electrode has been positively maintained at some definite potential positive or negative with respect to the battery mid-point. I have found, however, that even when not conductively connected to any definite potential, an electrode or any conductive object immediately adjacent the path of vibration of the reed will exert some influence on the waveform of the translated voltage, and will exert still different influences if, instead of being permitted to "float" or maintained at a potential difference from the battery mid-point, it is connected directly to the reed, or to the battery mid-point. I may, for example, produce distinctive waveform differences with otherwise similar reed, block and electrode assemblies, simply by change from insulating to conductive of the material of the block top 2c. A practical arrangement which at least partially makes use of these last phenomena is illustrated in Figures 11 and 12. Herein the block top 2c, as well as other portions of the block, is formed of insulating material; onto the upper surface of this top is fastened, as by cement, a flat, U-shaped conductive yoke 27, the three inner edges of which may coincide with the corresponding edges of the aperture 3. This yoke is electrically connected with a switch 28. By this switch it may be left floating; or connected to the reed; or connected to the mid-point of the battery 21; or connected to a slider 26e on the potentiometer 26 shunting the battery 21. When connected in the last of these manners the yoke acts in very similar fashion to an electrode of the screw type illustrated in Figure 10 positioned at its vertical level, excepting that it has a higher capacity to the reed and may be expected to yield a higher oscillation peak amplitude. The electrodes 19a and 19b of Figure 10 have been illustratively shown in Figure 11, together with their associated circuit as described for that figure.

I have described above arrangements for producing a wide variety of waveforms with a single reed. It may be more desirable in certain instances to employ for each note a plurality of reeds, each one being arranged for some waveform variation. In this case the first reed for any given note may have a fundamental vibrational frequency corresponding to that of the note and may be provided with a limited number of electrodes positioned appropriately to produce oscillations with a particular group of harmonics under good control—for example the octave partials or fundamental, second, fourth, etc., which may be nicely controlled by screws positioned as 19a, 19b and 19c in Figure 10. The other reeds for the same tone may then respectively have fundamental frequencies which are some other partials—for example the third, fifth, etc.,—of the note frequency, and each may be provided with electrodes appropriate to produce a series of its own partials (which of course will be also harmonic partials of the note frequency). This has been illustrated in Figure 13.

This is a cross sectional view of the base 4 with a plurality of reeds for a single note. The base is provided with a horizontal hole 29 which communicates with the air duct 6 for the particular note, and with which communicate the holes 5 leading into the spaces within the blocks 2 of all the reeds employed for this note. Two reeds, the fundamental reed 1 and the harmonic reed 31, have been illustrated in the figure. Each of these is secured to a block 2 of insulating material; and in the figure I have shown a very convenient arrangement of these blocks on the base 4. The extremity of the block near which the reed is fastened may be moved along the base 4 into impingement against the stop rail 51 and there retained in contact with the base as by a spring 52 engaging the top surface of the block. For the two reeds two stop rails 51 have been illustrated, being arranged so that the blocks for the two reeds are disposed between them and the free reed extremities therefore facing each other. Above the mutually adjacent ends of the blocks is provided a removable rail 53, which as by screws 54 is normally arranged to clamp the reeds against the base 4. On the top of and overhanging the rail 53 may be provided Bakelite or other insulating strips 55.

The electrode 19a of Figure 11 may be provided for the reed 1, passing through the insulating plate 55; a corresponding electrode 39a may be provided for the reed 31. The electrode 19b of Figure 11 may be provided for the reed 1, passing through the base 4 which is of course made of insulating material; a corresponding electrode 39b may be provided for the reed 31. About the reed 1 may be provided a yoke 27a; this may be generally similar to the yoke 27 of Figure 11 but in this instance is shown of light spring material riveted to the block top 2c only near the fastened reed extremity. The yoke is biased against the block top; but an insulating screw 56 is passed through the base 4 and block 2 into impingement against the bottom of the yoke 27a, and by rotation of this screw the vertical position of the yoke may be adjusted. A corresponding yoke 47a may be provided for the reed 31.

Figure 13:
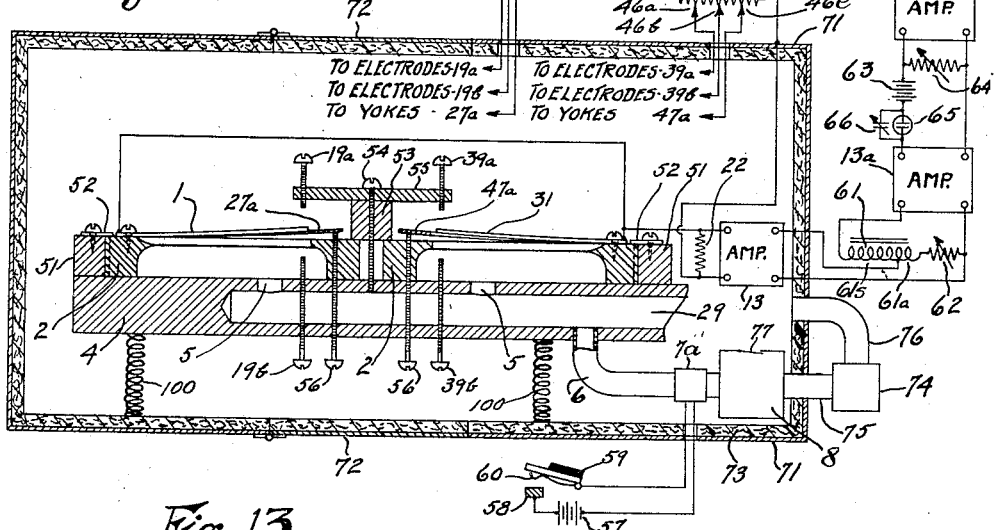
Figure 13 is a fractional view, partly cross-sectional and partly schematic, of an instrument embodying my invention.
Figure 14:
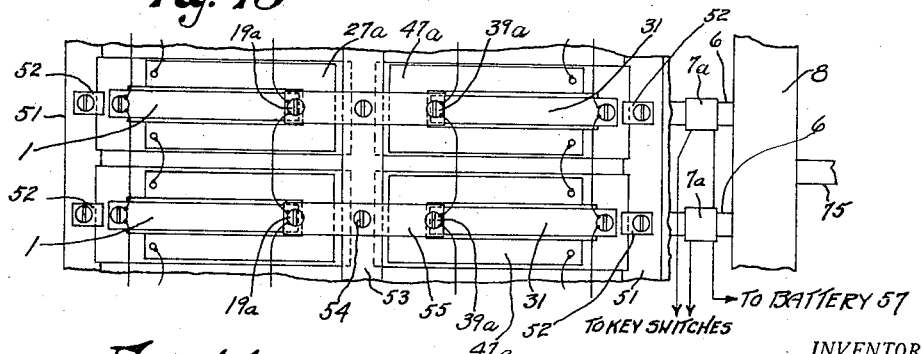
Figure 14 is a top view of a portion of the apparatus of Figure 13.

Figure 14 illustrates a top view of the assembly of Figure 13, for a plurality of notes. All the electrodes 19a for the several notes are electrically connected together; all the electrodes 19b are connected together; all the yokes 27a are connected together. The electrodes 39a and 39b and the yokes 47a are correspondingly connected. All the reeds, including the reeds 1 and the reeds 31, are connected together. Individual valves are of course provided for the several notes, connected by the ducts 6 into the common chest 8. These are designated as 7a and are for example of the electromagnetically operated type. Each may be energized from a battery 57, which is connected to one side of each valve and to a common conductive rail 58 situated underneath playing keys 59. Each key is provided with a spring 60, which upon key depression is brought into contact with the rail 58 and therefore forms therewith a key switch. The springs 60 are connected respectively to the valves 7a.

The connection of the electrodes and yokes to the electrical circuit are most readily illustrated in Figure 13. Herein it will be seen that the electrodes 19a and 19b and the yokes 27a are respectively connected to the sliders 26a, 26b and 26e on potentiometer 26; the electrodes 39a and 39b and the yokes 47a are respectively connected to the sliders 46a, 46b and 46e on potentiometer 46. These two potentiometers 26 and 46 are each shunted across the battery or other high voltage source 21. The source center point 21a and the reeds are connected to respectively opposite extremities of the high resistance 22, across which appears the amplifier 13 of previous figures.

The operation of this embodiment is of course fundamentally similar to that of preceding embodiments. The obvious elaborations are that the voltage across the resistance 22 upon vibration of the reeds for any one note is represented by the superposition of the voltages from the individual reeds for that note, and that the voltage across that resistance upon vibration of the reeds for a plurality of notes is represented in turn by the superposition of the several voltages which would be produced by the vibration of the reeds for the respective notes. Attention is called to the yokes as illustrated in Figure 13; these are connected and operated as electrodes, so that they give rise in each cycle of the oscillations to two peaks of jointly controlled amplitude and direction. The adjustability of the yokes in respect of position affords a means of obtaining a continuous, selective adjustment of the positions of these peaks within wide spectrums or portions of the cycle.

In Figure 13 I illustrate further features appropriate to or desirable in a complete instrument of the general type being dealt with. The apparatus so far described for this figure, with the exception of battery 21, potentiometers 26 and 46, and the key system, may be encased in a conductive reed housing 71; this may be connected to the battery center point 21a and forms an electrostatic shield for sensitive portions of the system. Hinged portions 72 may be provided for access to the interior.

In order that the inherent sound of the vibrating reeds may not itself be heard in the vicinity of the loudspeaker, to the detriment of the distinctive tone qualities produced by manipulation of the controls, sound absorbing material may advantageously be arranged quite completely to surround the reeds. This has been indicated in Figure 13 by the layer 73 of felt or other relatively soft and sound-absorptive material disposed about the interior of the reed housing 71. The use of the layer 73 also forms a means for isolating the reeds from the acoustic output of loudspeaker 15—i. e., of preventing acoustic feedback which might result in sustained self-oscillation of the system. The base 4 may also be isolated against vibrational conduction from the housing 71 which might otherwise occur, by being supported thereto through a resilient system schematically shown by the springs 100.

For suppressing reed sound and isolating from acoustic feed-back still more perfect means than the above described one alone may be obtained by arranging the system so that the air drawn by the chest 8 through the valves, ducts, and blocks in vibrating the reeds will be expelled by the chest into the space within the housing 71. This has been illustrated in Figure 13 by the showing of the blower 74 with intake duct 75 connected to the chest 8 for withdrawing air therefrom and with output duct 76 connected into the free space within the housing. The automatic valve 77 for relieving the chest of abnormally high suction forces may open directly into the chest from the space within the housing. By this arrangement there is avoided all acoustic connection of the air moved by the reed system with the outside air and with the loudspeaker.

Still further features have to do with the control of tone quality, or oscillation harmonic structure. The controls so far described influence the harmonic structure of the oscillations in accordance with particular partials of the individual notes. In combination therewith I may employ harmonic structure controls operative in accordance with absolute frequency. Thus in Figure 13 there is inserted following the amplifier 13 in the cascade a circuit by means of which the transmission-frequency characteristic of the system may be tipped, or in effect rotated about an intermediate frequency point. This circuit comprises an auto-transformer 61, which has a primary 61a and a secondary 61s comprising the entire auto-transformer, and a variable resistance 62 in series with the terminal of the auto-transformer common to primary and secondary. The incoming oscillations to the circuit—e. g., those from the amplifier 13—are applied across the primary 61a and variable resistance 62. The output from the circuit is taken from across the entire auto-transformer 61 and the variable resistance 62, the input of the amplifier being shown connected in this manner. Preferably the input impedance of the succeeding element in the cascade is very high, or substantially infinite; accordingly I have shown as 13a a further amplifier having such an input impedance.

This circuit has been shown and described in the co-pending application of Charles T. Jacobs, Serial No. 666,673, filed April 18, 1933. In brief, its operation may be described by noting that when the resistance 62 is adjusted to a high value, substantially the full voltage of the input oscillations to the circuit at all frequencies drops across the resistance 62 and is transmitted without sensible alteration to the amplifier 13a. When the resistance 62 is adjusted to a low value, however, the high frequency oscillation voltage appears largely across the primary 61a and is stepped up by the auto-transformer before application to the amplifier 13a. The primary inductance is made sufficiently low so that at low frequencies little voltage appears across the primary; the resistance 62 now being also low (relative to the impedance out of which the circuit works), the low frequency voltages are considerably attenuated. Typical values, appropriate to an average output impedance from amplifier 13 of 50,000 ohms, may be suggested as follows: total auto-transformer inductance, 50 henries; primary inductance, 2 henries; resistance variable from 5,000 to 500,000 ohms.

A further form of control which I may employ in combination with the controls already described is a control of the "formant" type, by which wave-form additions—in general of components in the chosen "formant" range—will be superposed on the other oscillations in accordance with the absolute frequency of the latter. This control may be for example of one of the types illustrated in U. S. Patent No. 1,933,299, issued October 31, 1933, to Oskar Vierling, and a circuit therefor has been shown in Figure 13 following the amplifier 13a. It comprises a relaxation circuit tuned to formant frequency, the circuit being serially formed of a battery 63, a resistance 64, and a glow lamp 65 shunted by a condenser 66. This series circuit is connected across the output terminals of the amplifier 13a, which output terminals will be assumed to be separated from each other as to D. C. by a moderate or low value of resistance. The resistance 64 and the condenser 66 may each be adjustable for the purpose of tuning the circuit to the desired formant frequency range. The battery 63 is arranged to have a voltage just under the ignition voltage of the glow lamp and the condenser 66 is therefore charged to such a voltage; but upon the impression of oscillations on the circuit the condenser voltage cyclicly will rise to a value greater than the lamp ignition voltage and initiate discharge of the condenser through the lamp, modifying the waveform of the oscillations being passed through the circuit.

Figure 15:
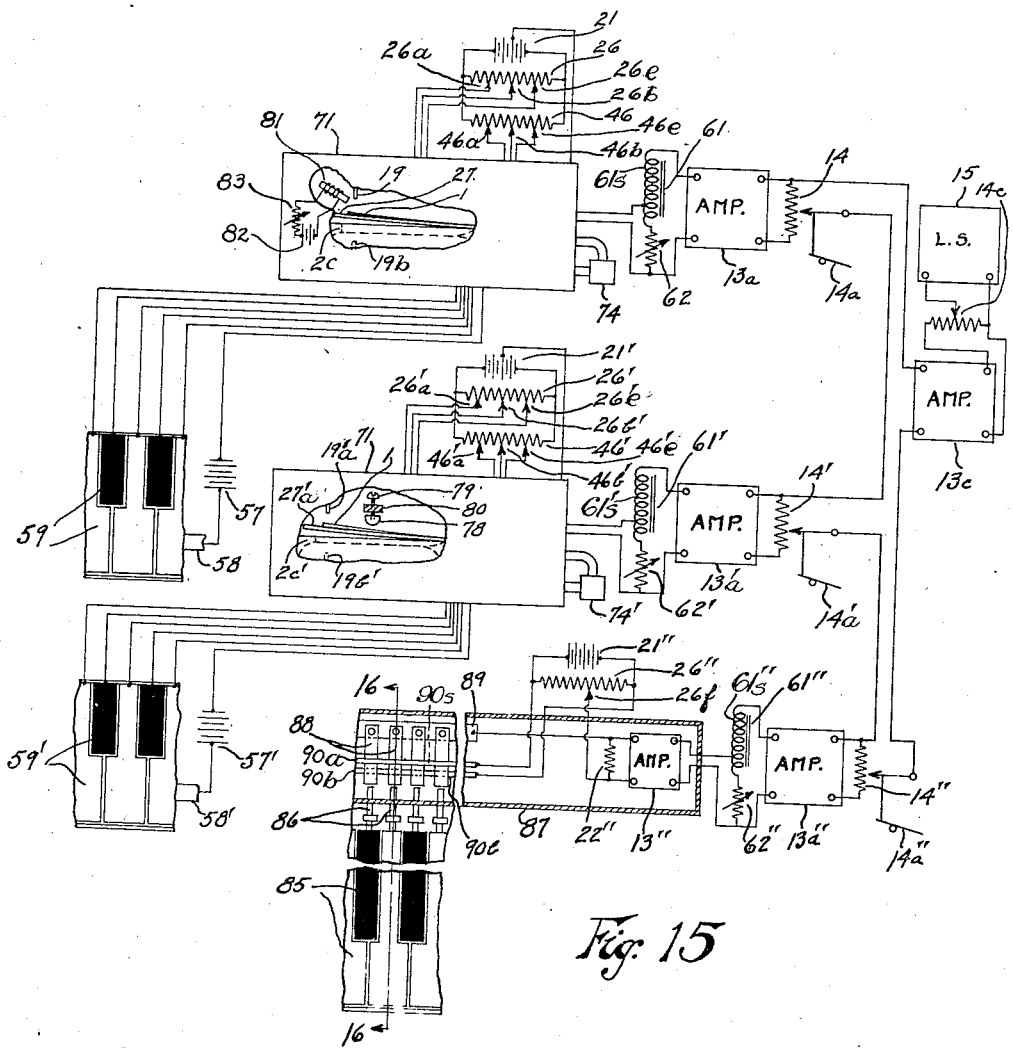
Figure 15 is a view, principally schematic, of a more elaborate instrument according to my invention.

The tone quality variations of which the instrument of Figures 13 and 14 is capable are of course effected by manipulation of the various controls therein. For rapid change or alternation between tone qualities, or for simultaneous playing with a plurality of tone qualities, it is desirable to provide an instrument with a plurality of manuals, the tones from each being subject to wide quality control. An instrument with such a plurality has been illustrated in Figure 15. This will first be described with reference to the upper two manuals, or two groups of playing keys 59 and 59' respectively. It will be understood that many of the portions of Figure 15 are similar to those of Figure 13 and other figures and that they have been designated with similar numerals—excepting that where more than one such similar part appears in Figure 15 the additional parts have been designated by prime or double-prime marks.

The keys of each of these groups are arranged for example for electrical valve control as illustrated in Figure 13; this is indicated by the conductive rail 58 or 58' and battery 57 or 57' associated with each group. Each group of keys 59 and 59' is wired to a respective reed housing 71, 71'. It will be understood that in Figure 15 each housing 71 or 71' is intended to include the apparatus shown within the housing 71 of Figure 13, in generally similar arrangement; the schematic illustration is adopted to avoid undue complexity. Thus with each group of keys 59 or 59' is associated its own system of reeds, each system being provided with the potentiometers 26 or 26' and 46 or 46' for tone quality variation. The electrical output from each reed system is passed through an individual amplitude-frequency control system 61–62 or 61'–62', and through an individual volume control 14 or 14'; the volume controls may if desired be operated by respective swell pedals 14a and 14a'. The outputs from the volume controls are both fed to the input of amplifier 13c, to the output of which is connected loudspeaker 15.

While the two reed systems may be entirely similar, I have found it advantageous to provide some qualitative distinctions therebetween, particularly in respect of the modes of vibration of respectively corresponding reeds in the two systems. I have schematically indicated this in Figure 15 by showing in each of the housings 71 and 71' a fragmentary view of a reed 1 or 1', with arrangements such as to result in different vibrational modes for the two reeds. Thus the reed 1' in the lower housing has been shown provided with a block 2' having a top 2c' of very much smaller thickness than that of the block top 2c in the upper housing; the influence of this thickness on vibrational mode was discussed above.

Another differentiation of vibrational mode may be provided by arranging above the reed, intermediate its fastened and free extremities and in spaced relation to the mean reed position, a stop member 78 against which the reed will impinge before the completion of its upstroke. The impingement of the intermediate reed portion against this stop member will of course markedly modify the vibrational mode of the reed and particularly of the free end portion from which translation is being principally effected. The stop member 78 may be carried by a screw 79 which is adjustable in stationary member 80 to regulate the spacing from the mean reed position. The member 78 may be made of material of greater or less resilience, according to the absence of stridency desired in the output tone.

Still another means of differentiating the vibrational modes of the two reeds has been illustrated in association with the top reed 1. This means comprises a magnet—conveniently an electromagnet—arranged adjacent the reed, which must be of magnetic material, and adapted to exert a force on the reed which varies throughout the cycle of the reed vibration because of varying reed displacement. I have illustrated an electromagnet 81, controllably energized by battery 82 through variable resistance 83. Obviously when this magnet is significantly energized it will modify the reed acceleration characteristic, and hence the velocity and displacement characteristics.

The instrument of Figure 15 is provided with a third manual, or group of keys 85, whose function is the production of a relatively highly damped tone—in distinction to the continuous tone produced by the air-operated reeds of the other manuals. The keys 85 carry at their rear extremities the plectrums 86, which pass through suitable apertures in the conductive reed housing 87 into adjacency to the free extremities of reeds 88. The manner of support of the plectrums and of their operation to pluck the reeds are detailed below in connection with the cross-sectional Figure 16. The reeds 88 used in this case need not be secured to blocks of the variety hereinabove described, but may be fastened at their rear extremities to a conductive rail 89. Above the reeds near their free extremities may be provided an electrode 90a, which may for example be common to the several reeds; it may be in the form of a narrow conductive strip, fastened to the edge of a Bakelite or other insulating strip 90s. An electrode 90b may be similarly provided below the reeds, being illustrated slightly displaced laterally from the electrode 90a in order that both may appear in Figure 15.

The electrodes 90a and 90b will be recognized as analogous to the electrodes 19a and 19b of earlier figures. As in earlier figures, the electrodes are connected through the voltage source to one side of a high resistance shown as 22, the reeds being connected to the other side. By way of simplification of control, however, I have shown connections such that the potential of one electrode is always of positive sign, and that of the other always of negative sign, with respect to the resistance 22"; the amplitudes of these voltages are differentially adjustable—i. e., as one is increased the other is reduced. The circuit comprises simply the connection of the two electrodes to respective extremities of the battery or voltage source 21", the resistance 22" being connected to the slider 26f on potentiometer 26" shunting the battery. Across the resistance 22" is connected the amplifier 13", the output from which may be passed through an amplitude-frequency control system 61"–62", a further amplifier 13a", and a potentiometer 14" controlled by a foot-swell 14a", before combination with the outputs of the other potentiometers 14 and 14'.

Figure 16:
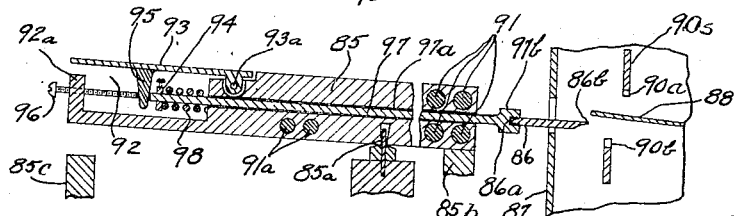
Figure 16 is a cross-sectional view taken along the line 16—16 of Figure 15.

Reference is invited to Figure 16, a cross sectional view taken along the line 16—16 of Figure 15; herein appears a key 85, pivoted as at 85a and having its rear extremity normally caused by weights 91 to rest on rail 85b. A rail 85c limits downward movement of the front end of the key. In the forward portion of the key is formed the large slot or well 92; this is covered by the finger-piece 93, hinged to the key proper by pivot 93a at the rear of the slot 92. To the bottom of the finger-piece at an intermediate point thereon is secured the arm 95, extending downwardly into the slot 92. Upward movement of the finger piece is limited by the impingement of arm 95 against a screw 96 passing through the forward slot wall 92a, by which screw 96 the upward limiting position of the finger piece about its pivot may be adjusted, this being desirably such that an appreciable space exists between finger piece in this limiting position and the top of wall 92a.

A longitudinal hole 97a is provided in the key 85, and in this hole slides the rod 97; this rod has the enlarged rear end portion 97b, which may be drilled and taped to admit the threaded end 86a of the plectrum 86—the plectrum being preferably of insulating material. The forward end of the rod 97 passes into the slot 92, and is biased forwardly into contact with the arm 95 by expansion spring 98 surrounding the rod 97 between the rear slot wall and a bushing 94 secured about the rod 97. This spring 98 also biases the finger-piece 93 to its upward limiting position abovementioned.

The spring 98 is sufficiently strong so if a slow downward pressure be applied on the finger piece 93, the latter will not move about its pivot and the pressure will be transmitted without loss or delay to the forward portion of the key. This will raise the rear end of the key, and the plectrum 86; the plectrum 86 is so adjusted in the rod extremity 97b that the tip 86b of the plectrum—normally at a slightly lower level than the free reed extremity—will in its upward movement just clear or barely touch the reed extremity. Considerable inertia, however, is imparted to the key 85 by the weights 91 (and by additional weights 91a, forward of the pivot 85a, if desired); consequently when the finger-piece is struck with any appreciable velocity, and hence moved suddenly downward, the spring 98 will yield appreciably and the finger-piece will move somewhat about its pivot 93a, before movement of the key proper becomes appreciable. The yielding of spring 99 produces rearward displacement of the rod 97 and the plectrum 86, and this displacement will at least partially obtain as the plectrum tip 86b reaches the level of the reed; the plectrum accordingly plucks the reed. The greater the velocity with which the finger-piece 93 is struck (up to some very high limiting velocity), the greater will be the movement of the finger-piece about its pivot, the greater will be the displacement of rod and plectrum, the greater will be the degree to which the plectrum will bend the reed before disengaging it, and the greater will be the amplitude of reed vibration. Of course whenever the finger-piece is kept fully depressed the key will be bottomed on the rail 85c and the finger-piece on the top of wall 92a; the rod and plectrum are thus displaced rearwardly to a maximum degree. But upon release of the finger piece it and the rod and plectrum, all being preferably of relatively low mass, will respond promptly to spring 98 and the plectrum will be clear of the reed when passing its level. The responsivity of the manual of keys 85 to velocity of touch, just explained, is a highly desirable characteristic.

I have elsewhere—i. e., in my co-pending application Serial No. 714,385, filed March 7, 1934, now Patent No. 2,007,302, granted July 9, 1935,—shown and described electrically operable vibrator plucking systems, both touch responsive and otherwise. While these are well adapted for use in an instrument of the type herein described, I have preferred to show herein the simple and efficient mechanical arrangement first described.

It is to be appreciated that since the reed, as early abovementioned, is freed of several of the requirements which it must meet in an acoustic organ, I may employ, for air excitation as well as for plucking, very small reeds; these in turn will require a very small flow of air for their stimulation. In an instrument of even a moderate number of reeds this is a great advantage, as the size and cost of the blower or suction system may be very greatly minimized. I especially prefer to minimize the reed size and the air flow so that the valve action of the reed will act on the minimum quantity of air; this alternatively or additionally to other means mentioned above reduces the acoustic sound output from the system.

Finally it will be understood that my invention is not intended to be limited by all the details of the embodiments illustrated and described herein, but that its scope is intended to be expressed in the following claims, as broadly as the state of the art will permit.

I claim:

1. In combination in a musical instrument, a tuned reed, a plurality of mechanico-electric translating devices variously associated with substantially a single portion of said reed, and electrical control means associated with the several said translating devices for varying their respective outputs.

2. In combination in a musical instrument, an electrically conductive tuned reed, a plurality of electrodes variously disposed with respect to substantially a single portion of said reed and each forming therewith an electrical capacity, means for maintaining voltages across the several said capacities, resistance in series with said maintaining means, and means for selectively varying the amplitude and sign of at least some of said voltages.

3. In combination in a musical instrument an electrically conductive tuned reed and means for vibrating the same, a plurality of electrodes adjacent thereto and adapted to be most nearly approached by said reed at respectively different instants in its vibrational cycle, and means for maintaining respectively different voltages on the several said electrodes.

4. In combination in a musical instrument, an electrically conductive tuned reed and means for vibrating the same, a plurality of electrodes adjacent thereto and adapted to be most nearly approached by said reed at different instants in its vibrational cycle, and means for investing at least some of said electrodes selectively with a plurality of different potentials and with floating potentials.

5. In combination in a musical instrument, an electrically conductive tuned reed and means for vibrating the same, a plurality of electrodes adjacent thereto and adapted to be most nearly approached by said reed at different instants in its vibrational cycle, and selective means for moving at least one of said electrodes to shift the instants of closest approach of said reed thereto.

6. In combination in a musical instrument, a plurality of tuned reeds having harmonically related natural periods of vibration, common means for simultaneously vibrating said reeds, a plurality of electrodes adjacent one of said reeds and adapted to be most nearly approached by said reed at respectively different instants in its vibrational cycle, at least one electrode adjacent the other of said reeds, means for maintaining voltages on the several said electrodes relative to the respective said reeds, and means for varying the amplitudes of said voltages.

7. A plurality of reeds, means terminating at said reeds for producing a flow of air wherewith to vibrate said reeds, and means for isolating said air flow from free atmosphere and for acoustically shielding said reeds, comprising an enclosure of sound-absorptive material disposed about said reeds and the reed extremity of the path of said air flow.

8. An organ comprising a plurality of manuals; a plurality of groups of reeds vibrationally responsive to said manuals respectively; means associated with each group of reeds for translating electric oscillations from their vibrations; and a plurality of means respectively connected with said translating means for independently controlling the waveform of the oscillations produced by each group of reeds, 9. An organ comprising a plurality of manuals; a plurality of groups of reeds vibrationally responsive to said manuals respectively; means associated with each group of reeds for translating electric oscillations from their vibrations; a plurality of means respectively connected with said translating means for independently controlling the waveforms of the oscillations produced by the several group of reeds in accordance with particular partials of the reed vibrations; and a plurality of means respectively connected in the output circuits of said translating means for independently controlling the oscillation waveforms in accordance with absolute frequency.

10. In a musical instrument, two reed blocks having tops of appreciably different thickness; two reeds respectively mounted to said blocks; and selective means for passing air through said two blocks, whereby to elicit reed vibrations of respectively different waveforms at will.

11. In a musical instrument, a tuned reed and means for producing vibration thereof; a mechanico-electric translating device adjacent the free extremity of said reed; and a stop member intermediate the extremities of said reed, in spaced relation to the rest position of said reed, and arranged to be impinged against by said reed during said vibration.

12. In a musical instrument, a tuned reed and means for producing vibration thereof; and means for modifying the waveform of said vibration, comprising a magnet positioned to include in its field a portion of the path of said vibration, and means for energizing said magnet.

13. A tuned reed and a touch-responsive plucking action therefor, comprising a pivoted key having appreciable inertia; a member slidable longitudinally of said key; a finger-piece connected to the forward portion of said key and arranged upon downward movement relative thereto to produce rearward displacement of said member; a plectrum carried by said member and adapted to pluck said reed to a degree increasing with said member displacement; and means biasing said finger piece against said downward relative movement, said means being weak enough to yield to the inertia of said key when said finger piece is forcefully struck, while being strong enough to resist yielding when said finger piece is lightly pressed.

14. In combination in a musical instrument, an electrically conductive tuned reed and means for producing vibration thereof, an electrode adjacent thereto and forming therewith a capacity oscillatorily varied by said vibration, and shielding means, adjacent said electrode, for modifying the mode of said oscillatory variation.

15. In combination in a musical instrument: a tuned vibrator; a plurality of electrodes in spaced relation to a single portion of said vibrator and forming therewith a plurality of vibration-varied capacities; capacity charging means, comprising means for maintaining said electrodes at respectively different mean potentials, all of said potentials being different from that of said vibrator; and means for limiting changes of charges in said capacities by vibrator vibration.

16. In combination in a musical instrument: a tuned vibrator; a plurality of electrodes, respectively in spaced relation to parts of said vibrator which vibrate with substantially identical waveform, and forming with said vibrator a plurality of vibration-varied capacities; capacity charging means, comprising means for maintaining said electrodes at respectively different mean potentials, all of said potentials being different from that of said vibrator; and means for limiting changes of charge in said capacities by vibrator vibration.

17. In combination in a musical instrument: a tuned vibrator; a plurality of electrodes in spaced relation to a single portion of said vibrator and forming therewith a plurality of vibration-varied capacities; capacity charging means, comprising means for maintaining said electrodes at respectively different mean potentials, at least one of said potentials being more negative and at least one being more positive than the potential of said vibrator; and means for limiting changes of charges in said capacities by vibrator vibration.

18. In combination in a musical instrument: a tuned vibrator; a plurality of electrodes, respectively in spaced relation to parts of said vibrator which vibrate with substantially identical waveform, and forming with said vibrator a plurality of vibration-varied capacities; capacity charging means, comprising means for maintaining said electrodes at respectively different mean potentials, at least one of said potentials being more negative and at least one being more positive than the potential of said vibrator; and means for limiting changes of charges in said capacities by vibrator vibration.

19. In combination in a musical instrument: a tuned vibrator; a plurality of electrodes in spaced relation to a single portion of said vibrator and forming therewith a plurality of vibration-varied capacities; capacity charging means, comprising means for maintaining said electrodes at mean potentials different from that of said vibrator; means for varying said electrode potentials relative to each other, including means for varying the sign of at least one of said electrode potentials relative to the potential of said vibrator; and means for limiting changes of charges in said capacities by vibrator vibration.

20. In combination in a musical instrument: a tuned vibrator; a plurality of electrodes, respectively in spaced relation to parts of said vibrator which vibrate with substantially identical waveform, and forming with said vibrator a plurality of vibration-varied capacities; capacity charging means, comprising means for maintaining said electrodes at mean potentials different from that of said vibrator; means for varying said electrode potentials relative to each other, including means for varying the sign of at least one of said electrode potentials relative to the potential of said vibrator; and means for limiting changes of charges in said capacities by vibrator vibration.

BENJAMIN F. MIESSNER.